United States Patent
Brissette et al.

(10) Patent No.: US 12,381,955 B2
(45) Date of Patent: Aug. 5, 2025

(54) SIGNALING INTENT TO ESTABLISH CONNECTIONS BETWEEN AUTONOMOUS SYSTEMS

(71) Applicants: Cisco Technology, Inc., San Jose, CA (US); PacketFabric, Inc., Culver City, CA (US)

(72) Inventors: Patrice Brissette, Gatineau (CA); Jiri Chaloupka, San Jose, CA (US); Robert Stephen Rodgers, Mountain View, CA (US); Bart Van De Velde, Adegem (BE); David Delano Ward, Capitola, CA (US); Kenneth Gray, Frederick, MD (US)

(73) Assignees: PacketFabric, Inc., Culver City, CA (US); Cisco Technology, Inc., San Jose, CA (US)

( * ) Notice: Subject to any disclaimer, the term of this patent is extended or adjusted under 35 U.S.C. 154(b) by 237 days.

(21) Appl. No.: 18/124,232

(22) Filed: Mar. 21, 2023

(65) Prior Publication Data

US 2023/0370526 A1 Nov. 16, 2023

Related U.S. Application Data

(60) Provisional application No. 63/340,114, filed on May 10, 2022.

(51) Int. Cl.
| | |
|---|---|
| *H04L 41/08* | (2022.01) |
| *H04L 45/00* | (2022.01) |
| *H04L 45/02* | (2022.01) |
| *H04L 61/5007* | (2022.01) |
| *H04L 67/141* | (2022.01) |

(52) U.S. Cl.
CPC ............ *H04L 67/141* (2013.01); *H04L 45/04* (2013.01); *H04L 45/72* (2013.01); *H04L 61/5007* (2022.05)

(58) Field of Classification Search
None
See application file for complete search history.

(56) References Cited

U.S. PATENT DOCUMENTS

| | | | |
|---|---|---|---|
| 11,277,328 B1 * | 3/2022 | Sharma | ................... H04L 45/04 |
| 11,425,022 B1 * | 8/2022 | Singh | ................. H04L 12/4633 |
| 2007/0260746 A1 | 11/2007 | Mirtorabi et al. | |
| 2009/0116483 A1 | 5/2009 | Anumala et al. | |

(Continued)

*Primary Examiner* — Christopher B Robinson
(74) *Attorney, Agent, or Firm* — Lee & Hayes, P.C.

(57) ABSTRACT

Techniques for devices in autonomous systems to utilize a protocol, such as a Border Gateway Protocol (BGP), to signal intent to instantiate services for establishing connections between the devices. For instance, first device(s) in a first autonomous system (AS) may determine to establish a connection with a second AS. The first device(s) may encode a service key into an Internet Protocol (IP) address where the service key indicates a service that is to be provisioned on second device(s) in the second AS. The first device(s) system may then advertise the IP address host-route using BGP, and the second device(s) may receive the BGP advertisement. The second device(s) may decode the service key from the IP address, and provision the service to establish the connection between the autonomous systems. Thus, the devices in may leverage existing protocols to signal intent to instantiate services and establish connections between autonomous systems.

20 Claims, 7 Drawing Sheets

(56) References Cited

U.S. PATENT DOCUMENTS

| | | |
|---|---|---|
| 2013/0279367 A1 | 10/2013 | Sarikaya |
| 2016/0197831 A1* | 7/2016 | De Foy ............... H04L 45/7453 370/392 |
| 2018/0351863 A1 | 12/2018 | Vairavakkalai et al. |
| 2020/0374212 A1* | 11/2020 | Boucadair ........... H04L 41/0886 |
| 2022/0166860 A1 | 5/2022 | Brissette et al. |

* cited by examiner

400 ⤴

```
┌─────────────────────────────────────────────────────────────────┐
│ DETERMINE, AT A FIRST CONTROLLER OF A FIRST AUTONOMOUS SYSTEM    │
│ (AS), TO ESTABLISH A CONNECTION BETWEEN A FIRST DEVICE IN THE    │
│ FIRST AS AND A SECOND AS                                         │
│ 402                                                              │
└─────────────────────────────────────────────────────────────────┘
                              │
                              ▼
┌─────────────────────────────────────────────────────────────────┐
│ ENCODE, BY THE FIRST CONTROLLER, A SERVICE IDENTIFIER (ID) INTO  │
│ AN INTERNET PROTOCOL (IP) ADDRESS, WHEREIN THE SERVICE ID        │
│ INDICATES A SERVICE THAT IS BEING REQUESTED TO BE PROVISIONED    │
│ ON A SECOND DEVICE IN THE SECOND AS TO ESTABLISH THE CONNECTION  │
│ 404                                                              │
└─────────────────────────────────────────────────────────────────┘
                              │
                              ▼
┌─────────────────────────────────────────────────────────────────┐
│ PROVIDE, BY THE FIRST CONTROLLER, THE IP ADDRESS TO THE FIRST    │
│ DEVICE                                                           │
│ 406                                                              │
└─────────────────────────────────────────────────────────────────┘
                              │
                              ▼
┌─────────────────────────────────────────────────────────────────┐
│ SEND, USING A CONTROL-PLANE PROTOCOL, OVER THE NETWORK, AND TO   │
│ THE SECOND AS, AN ADVERTISEMENT MESSAGE THAT INDICATES THE IP    │
│ ADDRESS IS AN IP ROUTE, WHEREIN THE SERVICE ID IS USABLE IN THE  │
│ SECOND AS TO PROVISION THE SERVICE ON THE SECOND DEVICE TO       │
│ ESTABLISH THE CONNECTION                                         │
│ 408                                                              │
└─────────────────────────────────────────────────────────────────┘
```

FIG. 4 ated May 10, 2022, the entire
SIGNALING INTENT TO ESTABLISH CONNECTIONS BETWEEN AUTONOMOUS SYSTEMS

CROSS REFERENCE TO RELATED APPLICATIONS

This application claims priority to U.S. Provisional Patent Application No. 63/340,114, filed May 10, 2022, the entire contents of which are incorporated herein by reference.

TECHNICAL FIELD

The present disclosure relates generally to mechanisms and techniques for signaling an intent to provision interconnects between service providers, and exchange information needed to establish the interconnects.

BACKGROUND

An autonomous system (AS) is a large network, or group of networks, that includes network devices that utilize a common routing policy. An AS has a set of Internet Protocol (IP) prefixes that are provided to the network devices in the network(s), and are generally controlled and supervised by a single entity or organization. Various protocols exist for establishing Inter-AS connections used to communicate between autonomous systems, such as Inter-AS options A, B, and C. These Inter-AS options allow service providers to interconnect the different autonomous systems to provide virtual private network (VPN) connections. For instance, providers of multiprotocol label switching (MPLS) VPN services, virtual private wire service (VPWS) VPN services, etc., are able to use Inter-AS options to create point-to-point connections between different autonomous systems.

Generally, autonomous systems may include provider edge (PE) routers that are connected to customer edge (CE) devices (e.g., hosts/servers, routers, switches, etc.) that are in VPNs of the customers. Additionally, autonomous systems can use PE routers to interconnect with PE routers in other autonomous systems. These PE routers that are used to connect different autonomous systems, which may be managed by the different service providers, are also known as autonomous system boundary routers (ASBRs).

As noted above, Inter-AS options A, B, or C may be used to interconnect the PE routers in the different autonomous systems to provide Inter-AS connectivity. Traditionally, in order to configure the edge routers (e.g., PE routers, ASBRs, etc.) with Inter-AS services, network operators have to access each edge device and instantiate the services on the edge devices. However, having to manually configure each device is cumbersome and error prone. Further, network operators often do not have direct access to edge devices, such as when the edge devices reside in a different AS, potentially managed by a different service provider, and the network operators are unable to provision a new service on those edge devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a system-architecture diagram of an example where a first device in a first autonomous system (AS) uses a control-plane protocol to signal an intent to establish a connection over a network and between the first AS and a second AS.

FIG. 2 illustrates a system-architecture diagram of an example where a second device in a second AS receives a control-plane advertisement including an IP route that signals an intent to establish a connection over a network and between the first AS and a second AS.

FIG. 4 illustrates a flow diagram of an example method for a first device in a first AS to utilize a protocol to signal an intent to a second device in a second AS to establish a connection over a network and between the first AS and a second AS.

DESCRIPTION OF EXAMPLE EMBODIMENTS

Overview

Figure 1:
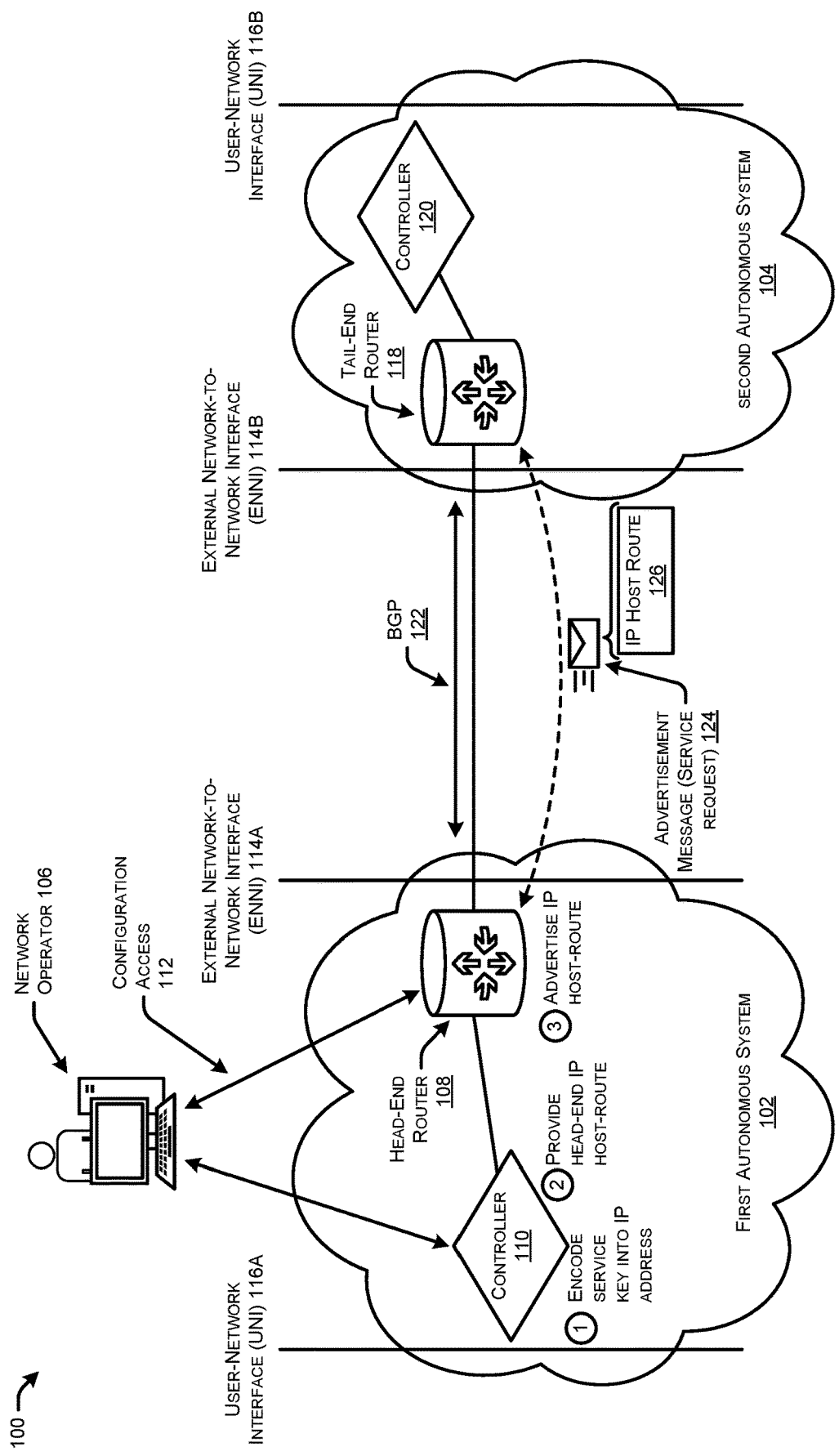

This disclosure describes techniques for a first device in a first autonomous system to utilize a protocol to signal intent to establish a connection over a network and between the first autonomous system and a second autonomous system (AS).

A first method to perform the techniques described herein may include determining, at a first controller of the first AS, to establish the connection between a first device in the first AS and the second AS. Further, the first method may include encoding, by the first controller, a service identifier (ID) into an Internet Protocol (IP) address. In some instances, the service ID indicates a service that is being requested to be provisioned on a second device in the second AS to establish the connection. The first method may additionally include providing, from the first controller, the IP address to the first device to be advertised/sent. Further, the first method may include sending, using a control-plane protocol, over the network, and to the second AS, an advertisement message that indicates the IP address is an IP route. Generally, the service ID is usable in the second AS to provision the service on the second device to establish the connection.

A second method to perform the techniques described herein may include utilizing a protocol to receive a request to establish a connection over a network and between a first AS and a second AS. The second method may include receiving, at the second AS, an advertisement message sent from a first device in the first AS. In some embodiments, the advertisement message includes an Internet Protocol (IP)

address associated with a host route. The second method may further include sending at least the IP address to a second controller of the second AS, and may include decoding, by the second controller, a service ID from the IP address. Further, the second method may include determining that the service ID indicates a service that is being requested to be provisioned on a second device in the second AS to establish the connection. Additionally, the second method may include provisioning the service on a second device in the second AS to enable establishment of the connection between the first AS and the second AS.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for devices in different autonomous systems to utilize a protocol, such as a Border Gateway Protocol (BGP), to signal intent to instantiate services for establishing interconnections between the devices in the different autonomous systems (or "Inter-AS connections"). For instance, a first network controller for a first autonomous system may receive a request that a connection be established between the first autonomous system and a second autonomous system. The first network controller may then encode a service key (or service identifier (ID)) into an Internet Protocol (IP) address (e.g., host-route) where the service key indicates the particular service (e.g., set up a circuit/connection) that is to be provisioned on a device (e.g., gateway, border router, etc.) in the second autonomous system. The first network controller may then provide a border router (or other edge device such as a gateway, etc.) with the IP address, which is encoded with the service key. The border router in the first autonomous system may then advertise the IP address host-route using BGP, such as via a BGP IP version 6 (IPv6) unicast Address Family (AF). A second border router in the second autonomous system may receive the BGP advertisement that includes the IP address, and work in conjunction with a second controller to instantiate the requested service that is encoded in the IP address. In this way, devices in different networks, such as different autonomous systems, may leverage existing control-plane protocols such as BGP to signal intent to instantiate services to establish connections between the autonomous systems.

As noted above, it is cumbersome and error-prone for network operators to manually instantiate nodes, such as PE routers, with new services to establish an Inter-AS connection. Further, interconnecting different networks, such as different autonomous systems operated by different service providers, to create end-to-end automated connectivity is difficult as there is no common or standard method to exchange essential information between the autonomous systems. Rather than network operators performing these operations, or requiring a network controller and protocol, the techniques described herein utilize existing routing or control-plane protocols, such as BGP, to signal an intent to establish on-demand connectivity between the autonomous systems.

As described herein, a node or device that signals an intent to initiate the instantiation of a service, circuit, and/or connection may be referred to as a "head-end" node, device, or router, and a node or device that receives that intent or request to instantiate the service and/or connection may be referred to as a "tail-end" node, router, or device. In some instances, the head-end and tail-end devices may be edge devices, such as routers or gateways, but the devices may be any other type of device as well configured to perform the techniques described herein.

Any routing or control-plane protocol can be used to perform the techniques described herein. However, it may be advantageous to utilize BGP to signal the intent to provision new services on tail-end devices due to its support of inter-AS environments, and its ability to extend support to EVPN services, VPWS services, and other L3 services. Even further, EVPN and L3 services are also driven or enabled by the BGP protocol. A network operator may have direct access to a head-end device and is able to configure or instantiate a new service on the head-end device. The head-end device may then utilize the routing protocol to push meaningful information to the tail-end device about the instantiation of a new service. In this way, the tail-end device may be instantiated with the new service without the network operator having to manually instantiate the service or even have access to the tail-end node.

According to the techniques described herein, head-end devices may utilize BGP advertisements in order to signal intent to tail-end devices instantiate services for establishing connections between the devices. For instance, a first network controller for a first autonomous system may receive a request (or instruction from a network operator) that a connection be established between the first autonomous system and a second autonomous system. The first network controller may then encode a service key/ID into an IP address (e.g., host-route) where the service key indicates the particular service that is to be provisioned on a tail-end device in the second autonomous system. The IP address may be an IP version 6 (IPv6 address) comprising 128 bits that are available for encoding information, or may be an IP version 4 (IPv4) address comprising 32 bits in which to encode information. In some instances, the IP address may be encoded with a hash of the service key in order to obfuscate the service key as the BGP advertisement is sent over one or more public networks (e.g., the Internet). In this way, a BGP advertisement may advertise an IP route as is normally performed using BGP, but the IP address may actually indicate a request for a tail-end device to instantiate a service as opposed to advertising an actual route.

After encoding the service key (and/or a hash of the service key) into the IP address, the first network controller may further encode various contact information associated with the first autonomous system, head-end device, and/or the IP route. For instance, the first network controller may encode a Unique Local Address (ULA) for the service/connection, a Service Route Identifier (SRI) associated with the service, and/or a Service Provider Identifier (SPI) associated with a service provider that manages the first autonomous system.

After encoding the relevant information into the IP address for the service for which establishment is being requested, the first network controller may provide the IP address to the head-end device. In one specific example, the first network controller may program the IP address host-route into a Routing Information Base (RIB) (and/or virtual routing and forwarding (VRF) context of the service) of the head-end device, which may be a BGP router. The IP route may be configured as "null" (or "null0") for the address such that IP packets that are sent to that specific host address are dropped by Layer 3 switches. That is, when a Layer 3 switch or device receives an IP packet destined for the IP route address, the Layer 3 device will drop the packet instead of forwarding it. In this way, the IP route address will not affect the data/forwarding plane of the networks, and the IP address will strictly be used for signaling of intent to provision a service and establish a connection.

The head-end device may then advertise the IP route (e.g., BGP IPv6 unicast Address Family (AF)). The first autonomous system and second autonomous system may have an external network-to-network interface (ENNI) that represents the boundary between the two systems. The head-end device may send the advertisement over the ENNI and to the second autonomous system. In some instances, the head-end device may send a BGP advertisement of the IP address host-route using the BGP "selective download" feature. The selective download feature indicates that routers and/or other network devices are to avoid from injecting the IP route into their forwarding data planes, such that the IP address host-route is not downloaded into RIBs or Forwarding Information Bases (FIBs) of the various devices. Otherwise, these network devices and routers would attempt to match packets against the host-route entry, which would lead to nothing because the IP route is not an actual host route, but is instead being used as a means to signal intent to provision a service and establish a connection between the autonomous systems.

A second device in the second autonomous system may receive the BGP advertisement indicating the IP address via the ENNI. In some instances, the second device (e.g., border router, gateway, etc.) may be configured to stream the IP address host-route using BGP Monitoring Protocol (BMP), and/or a telemetry streaming protocol, to a second controller in the second autonomous system. The second controller may decode the service key from the IP route (which may include using a hash function to determine the service key), and use the service key to determine what service to provision. For instance, the service key may be used to look up a service ID in a service menu or listing. The second network controller may determine, for example, to set up a service that is usable to establish a network interconnection between the first and second autonomous systems. The second network controller may then start provisioning the service on a tail-end router (or other device) based on the service key to establish the interconnection between the autonomous systems.

In some instances, the inter-connection between the two autonomous systems may be included in an end-to-end connection that spans additional networks beyond the two autonomous systems.

In some examples, the BGP signaling and communication techniques described herein may be bi-directional in that the devices in the different autonomous systems (or networks) may communicate back-and-forth with each other by encoding information in IP routes that are sent using BGP advertisements (or another control-plane/routing protocol). Further, the IP address routes may be encoded with additional types of information associated with provisioning the service and establishing the connection. In some examples, when the IP routes are advertised, the IP length can further be used to provide a set of services to be enabled, rather than just a single service.

For instance, the IP addresses may be encoded with request identifiers (IDs) that may be used for handling repeated requests, a service ID that is used to identify the service to instantiate, a quality-of-service (QoS) indicating how much bandwidth is allowed or allocated on the service, a maximum transmission unit (MTU) setting that defines the largest packet size that can be transmitted by the service to avoid fragmentation or dropped packets, etc. Further, the IP addresses may be encoded with requests for information usable for operations, administration, and management (OAM). As an example, the IP address(es) may be encoded with a request for timestamp data that is usable to measure the round-trip delay between the service request and a service acknowledgement sent from the tail-end devices.

In some instances, the IP address may have one or more reserved bits in which information may be encoded, such as a transaction bit (e.g., a transaction timer) or a work-in-progress bit (WIP). The WIP bit may specify a period of time during which the service must be instantiated, and/or a period of time the service key expires. Further, the reserved bits may include one or more error-in-service (EIS) bits that specify potential errors that may have occurred while attempting to instantiate the service. For instance, the error-in-service bit may indicate transaction errors such as a Key Lookup Failure and resource failures, and/or continuity errors such as Ethernet OAM (E-OAM) errors (e.g., Remote Excessive Error, Local Excessive Error, etc.). The head-end and tail-end devices may communicate IP addresses back-and-forth using BGP advertisements to signal various information about the instantiation of the service.

In some instances, the EIS bits may be used to not only signal intent in an original transaction, but also ongoing continuity management operations. For instance, the reserved bits may be used to signal continuity errors (e.g., Remote Excessive Errors, Local Excessive Errors, etc.). In some examples, the EIS bits may be used to indicate whether or not the tail-end router should expect continuity management from the head-end router.

While the techniques below are often described with reference to BGP, the techniques are equally applicable to any routing protocol or control-plane protocol. Further, although some techniques are described with respect to MPLS and/or Segment routing (SR), the techniques are equally applicable for underlay and transport protocol such as SR version 6 (SRv6), Virtual extensible LAN (VxLAN), etc. Further, the techniques are appliable for various IP tunnels such as Generic UDP Encapsulation (GUE), MPLS-over-UDP (MPLSoUDP), Generic Routing Encapsulation (GRE), Generic Protocol Extension (GPE), Point-to-Point Protocol over Ethernet (PPPoE), etc. Additionally, while the techniques described herein are with reference to VPWS, the techniques around BGP are equally applicable in terms of address-family for L2 bridging services and L3VPN services.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example where a first device in a first autonomous system 102 uses a control-plane protocol to signal an intent to establish a connection over a network and between the first autonomous system 102 and a second autonomous system 104.

The network autonomous systems 102 and 104 (or simply "autonomous systems") are each large networks, or groups of networks, that include network devices that utilize a common routing policy. The network autonomous systems 102/104 each have a set of IP prefixes that are provided to the network devices in the network(s), and are generally controlled and supervised by a single entity or organization. Various protocols exist for communicating across one or more autonomous systems, such as VPWS, EVPN, etc. In some examples, the autonomous systems 102/104 may each be MPLS networks that switch packets using labels rather than IP addresses or layer 3 information, IP networks that communicate packets using unique IP addresses, etc. In various examples, the autonomous systems 102/104 may be MPLS/IP networks where an IP packet is encapsulated within a packet with a header label (e.g., label switching).

As shown, the first autonomous system 102 may include a head-end router 108 (also referred to herein as a "first device"), which may be a provider edge (PE) router, that is located at an edge of a provider network and may further be connected to a customer edge router that is located at customer premises. The head-end router 108 may interact and/or be controlled by a network controller 110 that performs various control-plane operations. The network controller 110 may generally be any type of software-defined controller that utilizes control-plane protocols, or other network protocols, to control the autonomous system 102.

Further, a network operator 106 (e.g., service provider) may have configuration access to the controller 110 and/or head-end router 108 such that the network operator 106 is able to push configuration changes to the devices in the autonomous system 102. The network operator 106 may be able to use the configuration access 112 to trigger various operations, such as instructing the controller 110 to cause establishment of a service and connection between the first and second autonomous systems 102/104.

FIG. 1 illustrates an inter-AS links between the different autonomous systems 102 and 104. Each autonomous system 102 and 104 may have one or more user-network interfaces (UNIs) 116A and 116B that illustrate the physical demarcation points between the responsibilities of the subscriber (e.g., the Customer Edge or CE) and the responsibility of the Service Provider. Similarly, each autonomous system 102 and 104 may have one or more external network-to-network interfaces (ENNIs) 114A and 114BB that illustrate demarcation points representing the boundaries between two operator network that are operated as separate administrative domains. The ENNIs 114A may include or correspond to one or more ports that are connected to other ENNI port(s) 114B in the second autonomous system 104 that are associated with a different domain. As illustrated, the second autonomous system 104 may include a respective tail-end router 118 and controller 120 that each have similar, or the same, functionality and abilities as the head-end router 108 and controller 110.

In some instances, the network operator 106 and/or controller 110 may determine that a connection is to be established between the first and second autonomous systems 102, and that a service is to be instantiated to enable the connection. The service may be any type of service, such as an Inter-AS service (e.g., EVPN Inter-AS) between two customers connected via two PE routers (108 and 118). The controller 110 may receive an instruction from the network operator 106, and/or another entity, to establish the connection between the head-end and tail-end routers 118. The controller 110 may provision the service on the head-end router 108 if it is not already provisioned thereon. However, while the network operator 106 has configuration access 112 to the head-end router, but not the tail-end router 118 in some examples. In other examples, it may be time consuming and error prone for the network operator 106 to gain access and configure every PE router with a service. Thus, it is advantageous for the network operator 106 to enable the far end circuit on tail-end router 118 using his configuration access 112 to head-end router 108 and via one or more protocols. That is, the network operator 106 wants the capability to inform the tail-end router 118 about the new services provisioning, its enablement, and its application. To help accomplish this, the head-end router 108 may advertise the service using BGP (and/or another protocol) where BGP advertisements are used to signal an intent to provision the service on the tail-end router 118 to establish the connection.

At "1," the controller 110 may encode a service key/ID into an IP address (e.g., host-route) where the service key indicates the particular service that is to be provisioned on a tail-end device in the second autonomous system. The IP address may be an IP version 6 (IPv6 address) comprising 128 bits that are available for encoding information, or may be an IP version 4 (IPv4) address comprising 32 bits in which to encode information. In some instances, the IP address may be encoded with a hash of the service key in order to obfuscate the service key as the BGP advertisement is sent over one or more public networks (e.g., the Internet). In this way, a BGP advertisement may advertise an IP route as is normally performed using BGP, but the IP address may actually indicate a request for a tail-end device to instantiate a service as opposed to advertising an actual route. After encoding the service key (and/or a hash of the service key) into the IP address, the first network controller 110 may further encode various contact information associated with the first autonomous system 102, head-end device 108, and/or the IP route. For instance, the first network controller 110 may encode a Unique Local Address (ULA) for the service/connection, a Service Route Identifier (SRI) associated with the service, and/or a Service Provider Identifier (SPI) associated with a service provider that manages the first autonomous system 102.

At "2," the controller 110 may provide the head-end router 108 with the IP address host-route to be advertised using BGP. In some instances, the controller 110 may simply instruct the head-end router 108 to advertise the IP address host-route using BGP and without updating any information bases (e.g., FIB or RIB) of the head-end router 108. In some instances, however, the controller 110 may program the IP address host-route into a Routing Information Base (RIB) (and/or virtual routing and forwarding (VRF) context of the service) of the head-end device 108, which may be a BGP router. The IP route may be configured as "null" (or "null0") for the address such that IP packets that are sent to that specific host address are dropped by Layer 3 switches. That is, when a Layer 3 switch or device receives an IP packet destined for the IP route address, the Layer 3 device will drop the packet instead of forwarding it. In this way, the IP route address will not affect the data/forwarding plane of the networks, and the IP address will strictly be used for signaling of intent to provision a service and establish a connection.

The head-end router 108 may then at "3" advertise the IP route 126 (e.g., BGP IPv6 unicast Address Family (AF)). The first autonomous system 102 and second autonomous system 104 may have the respective ENNIs 114/114B that represent the boundaries between the two systems. The head-end router 108 may send the advertisement over the ENNI 114A and to the second autonomous system 104. In some instances, the head-end router 108 may send a BGP advertisement 124 of the IP address host-route using the BGP "selective download" feature. The selective download feature indicates that routers and/or other network devices are to avoid from injecting the IP route into their forwarding data planes, such that the IP address host-route is not downloaded into RIBs or FIBs of the various devices. Otherwise, these network devices and routers would attempt to match packets against the host-route entry, which would lead to nothing because the IP route is not an actual host route, but is instead being used as a means to signal intent to provision a service and establish a connection between the autonomous systems 102/104.

Figure 2:
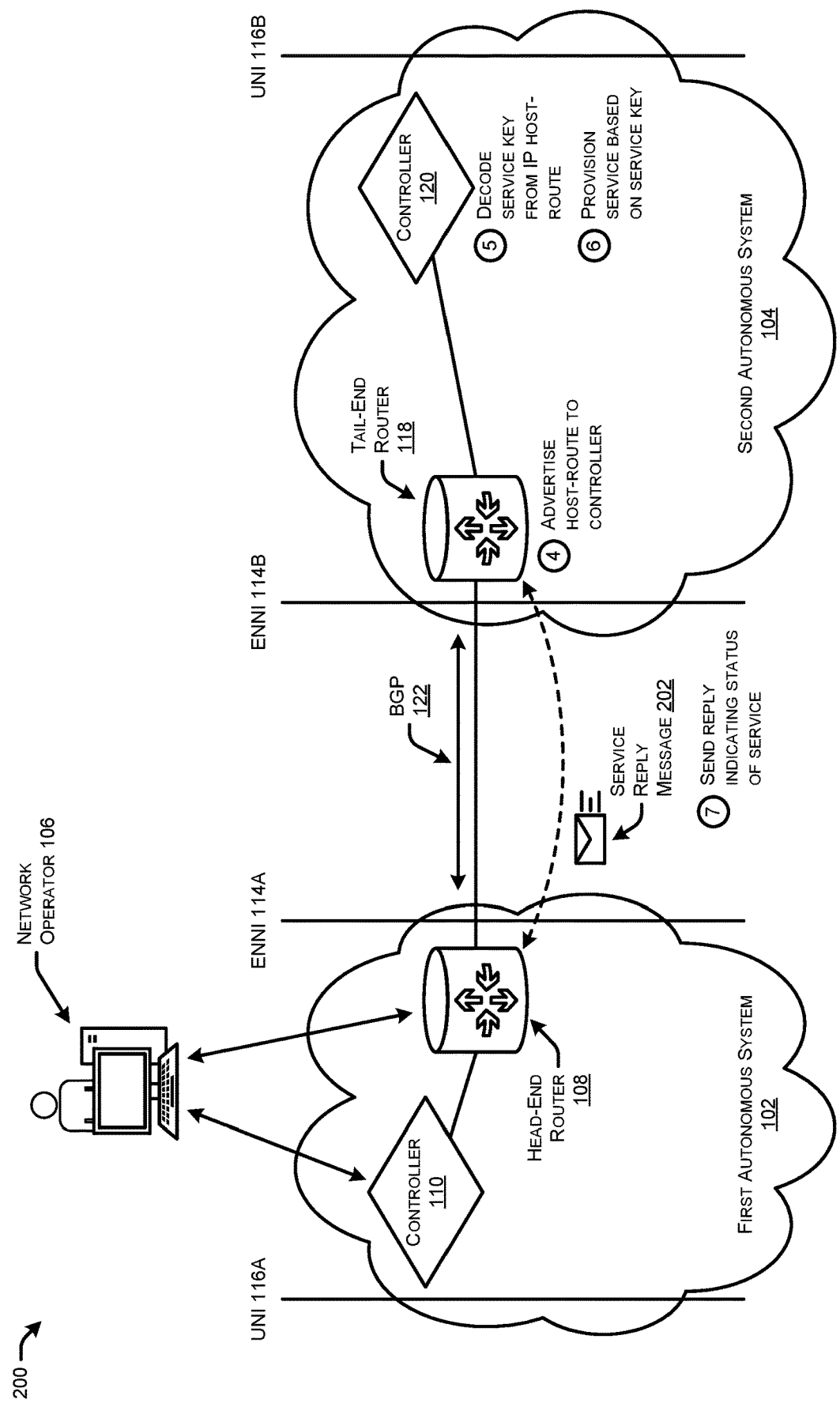

FIG. 2 illustrates a system-architecture diagram of an example where a second device in a second AS receives a control-plane advertisement including an IP route that signals an intent to establish a connection over a network and between the first AS and a second AS.

At "4," the tail-end router 118 (also referred to herein as "second device") in the second autonomous system 104 may receive the BGP advertisement 124 indicating the IP address 126 via the ENNI 114B. In some instances, the tail-end router 118 (e.g., border router, gateway, etc.) may be configured to stream the IP address 126 host-route using BGP Monitoring Protocol (BMP), and/or a telemetry streaming protocol, to the second controller 120 in the second autonomous system 104.

At "5," the second controller 120 may decode the service key from the IP route 126 (which may include using a hash function to determine the service key), and use the service key to determine what service (or set of services) to provision. For instance, the service key may be used to look up a service ID in a service menu or listing. The second network controller 120 may determine, for example, to set up a service that is usable to establish a network connection between the first and second autonomous systems 102/104.

The second network controller 120 may then, at "6," start provisioning the service on a tail-end router (or other device) based on the service key to establish the connection between the autonomous systems 102/104 (e.g., establish an EVPN Inter-AS connection over an Inter-AS link).

In some examples, the BGP signaling and communication techniques described herein may be bi-directional in that the devices in the different autonomous systems (or networks) may communicate back-and-forth with each other by encoding information in IP routes that are sent using BGP advertisements (or another control-plane/routing protocol). Further, the IP address routes may be encoded with additional types of information associated with provisioning the service and establishing the connection.

At "7," the tail-end router 118 may be provided with another IP route that is encoded with a service reply message 202 indicating a state of the service being provisioned. For instance, the service reply message 202 may include another IP route that indicates that the service was successfully provisioned, was unable to be provisioned, and/or other information associated with the service request.

For instance, the IP addresses may be encoded with request IDs that may be used for handling repeated requests, a service ID that is used to identify the service to instantiate, a quality-of-service (QoS) indicating how much bandwidth is allowed or allocated on the service, a maximum transmission unit (MTU) setting that defines the largest packet size that can be transmitted by the service to avoid fragmentation or dropped packets, etc. Further, the IP addresses may be encoded with requests for information usable for operations, administration, and management (OAM). As an example, the IP address(es) may be encoded with a request for timestamp data that is usable to measure the round-trip delay between the service request and a service acknowledgement sent from the tail-end devices.

In some instances, the IP address may have one or more reserved bits in which information may be encoded, such as a transaction bit (e.g., a transaction timer) or a work-in-progress bit (WIP). The WIP bit may specify a period of time during which the service must be instantiated, and/or a period of time the service key expires. Further, the reserved bits may include one or more error-in-service (EIS) bits that specify potential errors that may have occurred while attempting to instantiate the service. For instance, the error-in-service bit may indicate transaction errors such as a Key Lookup Failure and resource failures, and/or continuity errors such as Ethernet OAM (E-OAM) errors (e.g., Remote Excessive Error, Local Excessive Error, etc.). The head-end 108 and tail-end routers 118 may communicate IP addresses back-and-forth using BGP advertisements to signal various information about the instantiation of the service.

In some instances, the EIS bits may be used to not only signal intent in an original transaction, but also ongoing continuity management operations. For instance, the reserved bits may be used to signal continuity errors (e.g., Remote Excessive Errors, Local Excessive Errors, etc.). In some examples, the EIS bits may be used to indicate whether or not the tail-end router should expect continuity management from the head-end router.

While any routing protocol can be used to perform the techniques described herein, it may be advantageous to utilize BGP to signal intents to establish new services on tail-end routers 118 due to its support of inter-AS environments, and its ability to extend support to EVPN services. Even further, EVPN and L3 services are also driven or enabled by the BGP protocol. After the network operator 106 uses direct configuration access 112 to configure or instantiate the new service on the head-end router 108, the head-end router 108 may then utilize the routing protocol to push meaningful information to the tail-end router 118 about the instantiation of the new service.

Generally, the autonomous systems 102/104 may be any type of network that has a collection of connected IP routing prefixes under the control of one or more operators of administrative entities. The AS 102 may utilize a common and clearly defined routing policy to the Internet. An Internet Service Provider (ISP), a cloud provider, an enterprise network, etc., are examples of an AS 102. The AS 102 may include one or more networks implemented by any viable communication technology, such as wired and/or wireless modalities and/or technologies. The distributed application as 102 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The AS 102 may include devices, virtual resources, or other nodes that relay packets from one network segment to another by nodes in the computer network. Although described as head-end routers 104 and tail-end routers 106, the routers 104/106 may be and type of PE or CE router, as well as any other type of networking node on which services may be instantiated according to the techniques described herein.

Figure 3A:
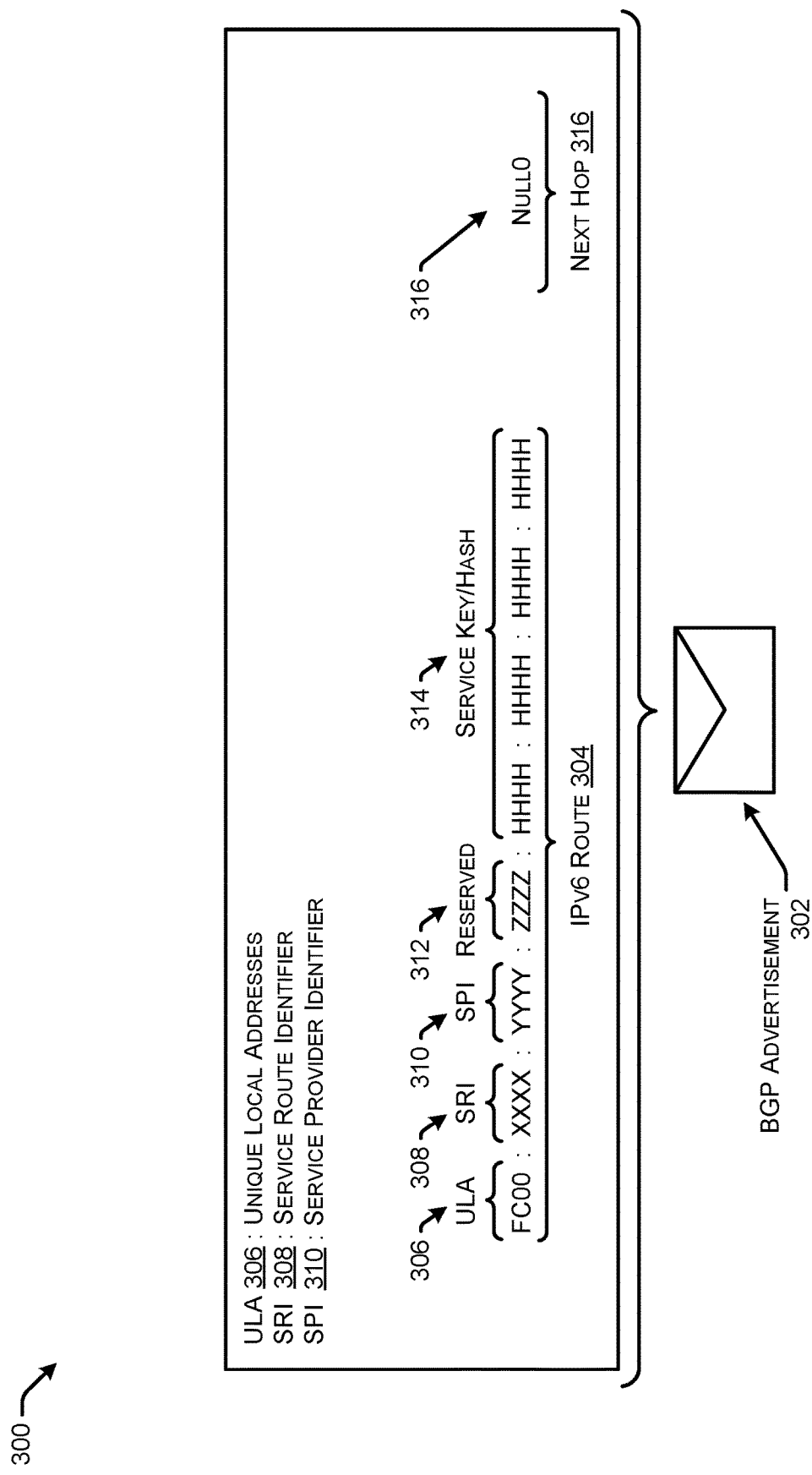
FIG. 3A illustrates an example diagram of an IPv6 route encoded with information that signals an intent for a tail-end device to instantiate a service and that is advertised using a BGP advertisement.

FIG. 3A illustrates an example diagram 300 of a BGP advertisement 302 that includes an IPv6 route 304 that is encoded with information that signals an intent for a tail-end device 118 to instantiate a service and that is advertised using the BGP advertisement 302.

According to the techniques described herein, head-end routers 108 may utilize BGP advertisements 302 in order to signal intent to tail-end routers 118 instantiate services for establishing connections between the routers. As shown, the BGP advertisement 302 in this example may be used to advertise an IPv6 route 304 that comprises 128 bits that are available for encoding information. However, in some instances the IP address may be an IPv4 address comprising 32 bits that are available to encode information.

The IPv6 route 304 may be encoded with various contact information associated with the first autonomous system 102, head-end router 108, and/or the IP route. For instance, the first network controller 110 may encode a Unique Local Address (ULA) 306 for the service/connection, a Service Route Identifier (SRI) 308 associated with the service, and/or a Service Provider Identifier (SPI) 310 associated with a service provider that manages the first autonomous system 102. Additionally, the IPv6 route may included various reserved bits 312 for different purposes and may optionally be populated.

As shown, the IPv6 route 304 may further be encoded with a service key/ID, or a hash of the service key 314, in order to obfuscate the service key as the BGP advertisement is sent over one or more public networks (e.g., the Internet). In this way, a BGP advertisement may advertise an IP route as is normally performed using BGP, but the IP address may actually indicate a request for a tail-end device to instantiate a service as opposed to advertising an actual route. The service key/ID may be used to look up a service ID in a service menu or listing that indicates the service requested to be instantiated. Generally, the service key/ID 314 may be a value identifying the service to instantiate. In the case of VPWS, the service key/ID 314 may be the equivalent of Ethernet tag ID. The usage of service key/ID 314 may refer to a specific template ID describing the service to instantiate and that is known by tail-end router 118.

Additionally, the IPv6 route may be encoded with a next hop 316 portion that may be "null" (or "null0") such that IP packets that are sent to that specific IPv6 route 304 are dropped by Layer 3 switches. That is, when a Layer 3 switch or device receives an IP packet destined for the IPv6 host-route 304, the Layer 3 device will drop the packet instead of forwarding it. In this way, the IPv6 host-route 304 will not affect the data/forwarding plane of the networks, and the IPv6 host-route may will strictly be used for signaling of intent to provision a service and establish a connection.

Figure 3B:
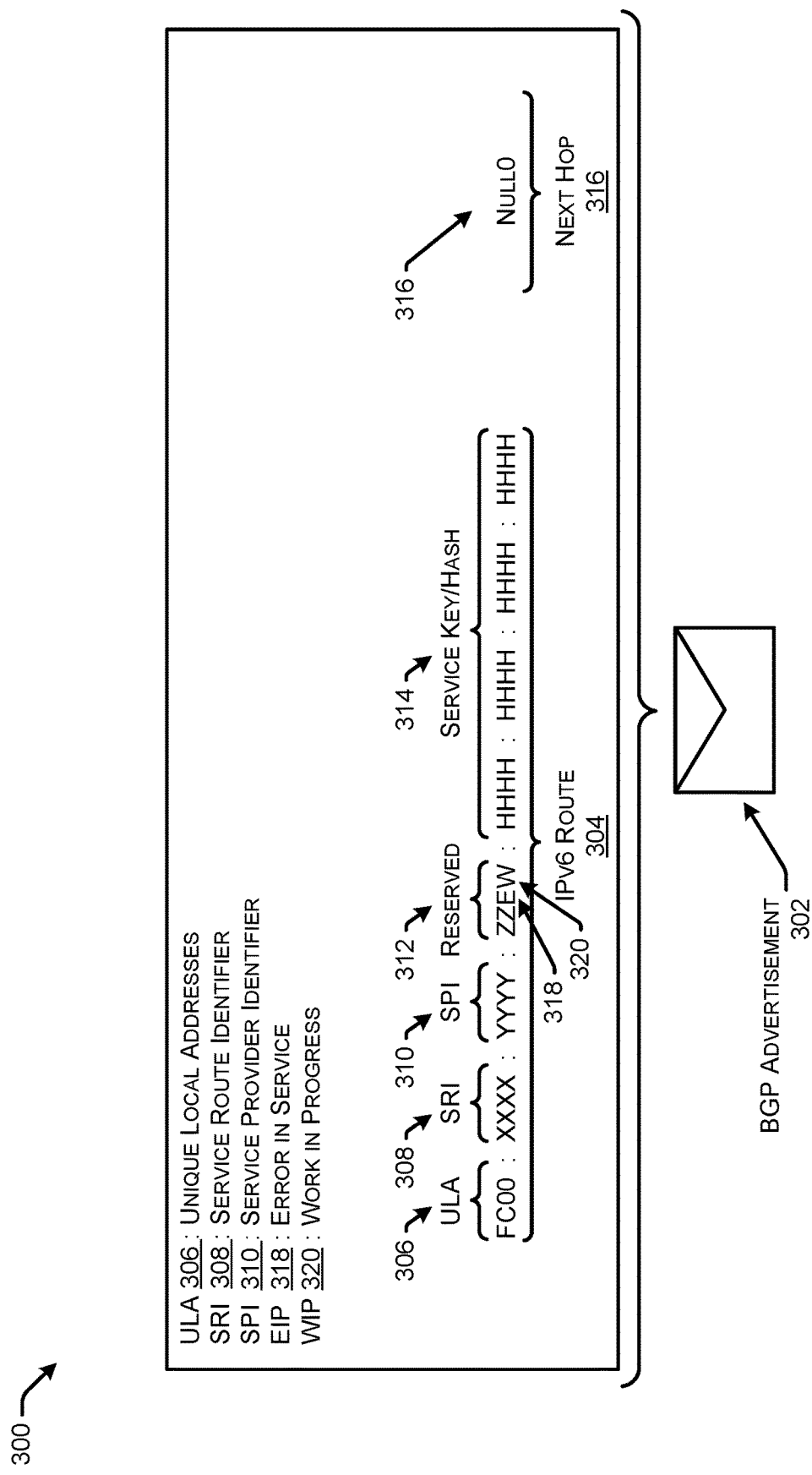
FIG. 3B illustrates another example diagram of an IPv6 route encoded with information that signals an intent for a tail-end device to instantiate a service, has reserved bits for potential errors, and that is advertised using a BGP advertisement.

FIG. 3B illustrates another example diagram of an IPv6 route encoded with information that signals an intent for a tail-end device to instantiate a service, has reserved bits for potential errors, and that is advertised using a BGP advertisement.

As shown, the reserved portion 312 of the IPv6 route 304 may optionally be encoded with additional bits, such as an error in service ("EIP") bit 316, and/or a work-in-progress ("WIP") bit 318 (and/or multiple bits for one or both of 316 and 318).

The WIP bit may specify a period of time during which the service must be instantiated, and/or a period of time the service key expires. Further, the reserved bits 312 may include the EIP bit 318 that specifies potential errors that may have occurred while attempting to instantiate the service. For instance, the EIP bit 318 may indicate transaction errors such as a Key Lookup Failure and resource failures, and/or continuity errors such as Ethernet OAM (E-OAM) errors (e.g., Remote Excessive Error, Local Excessive Error, etc.). The head-end and tail-end devices may communicate IP addresses back-and-forth using BGP advertisements to signal various information about the instantiation of the service.

In some instances, the EIS bits 316 may be used to not only signal intent in an original transaction, but also ongoing continuity management operations. For instance, the reserved bits may be used to signal continuity errors (e.g., Remote Excessive Errors, Local Excessive Errors, etc.). In some examples, the EIS bits 316 may be used to indicate whether or not the tail-end router should expect continuity management from the head-end router.

The routers 108/118 may communicate back-and-forth using BGP to communicate about instantiation of the service. For instance, the tail-end router 118 may use routes to indicate that the tail-end router 118 was unable to instantiate the service, and that there was some error. The routers 108/118 may attempt to troubleshoot the error and fix the tail-end router 118 such that it can instantiate the service. In some instances, the head-end router 108 may receive the IP route indicating the error and determine to instantiate a different service on the tail-end router 118. The head-end router 108 may then send another IP route using BGP to the tail-end router 118 to instantiate a different service on the tail-end router 118.

Figure 5:
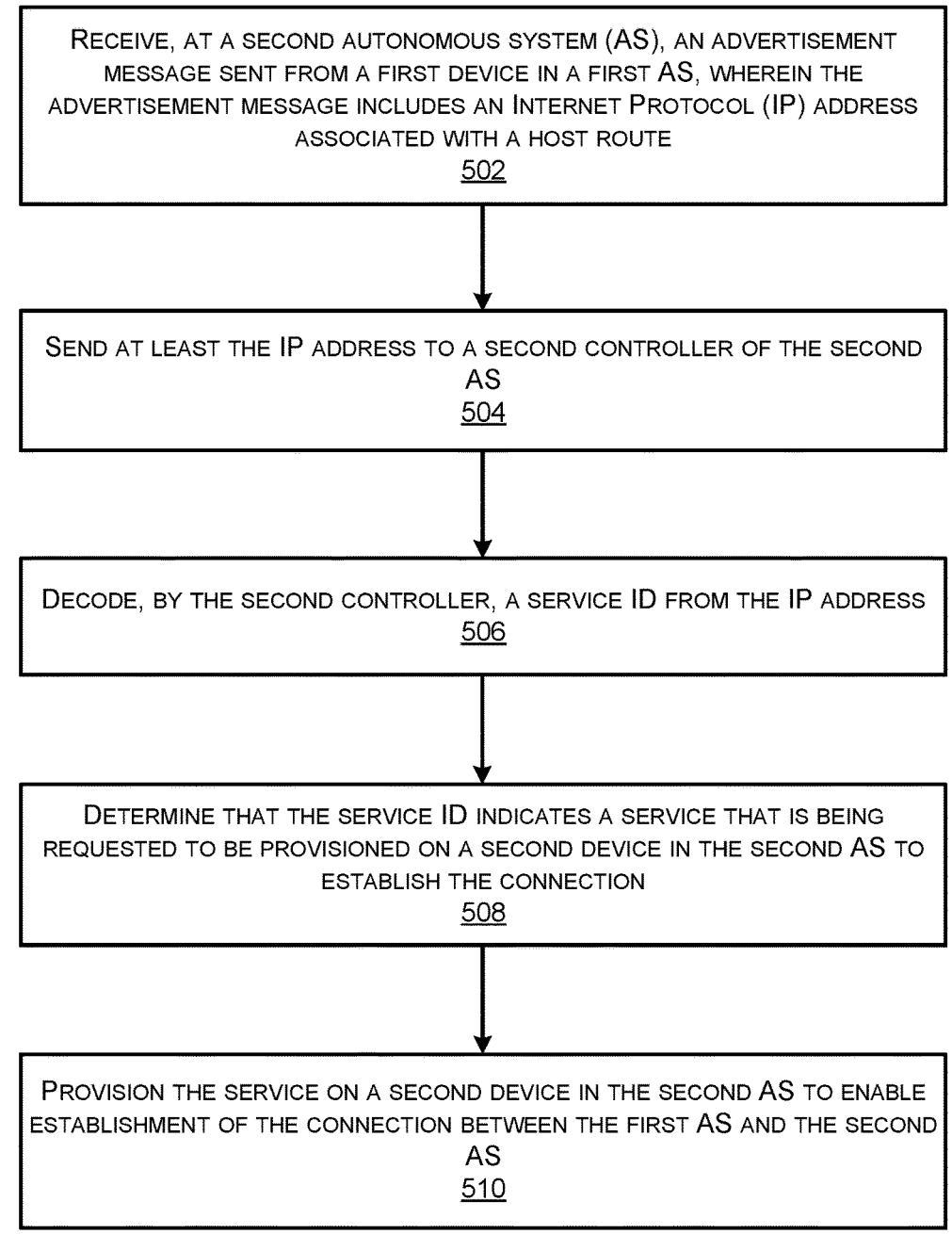
FIG. 5 illustrates a flow diagram of an example method for a second device to instantiate a service using instantiation information provided in an IP route advertised from a first device.

FIGS. 4 and 5 illustrate flow diagrams of example methods 400 and 500 that illustrate aspects of the functions performed at least partly by the devices in the distributed application architecture as described in FIGS. 1-3B. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 4 illustrates a flow diagram of an example method 400 for a first device (e.g., head-end router 108) in a first AS to utilize a protocol to signal an intent to a second device in a second AS to establish a connection over a network and between the first AS and a second AS. The method may be for a first device (e.g., head-end router 108) to utilize a protocol (e.g., BGP or another routing protocol) to signal an intent for a second router (e.g., tail-end router 118) to instantiate a service on the second device.

At 402, a first controller may determine, at a first controller of the first AS, to establish the connection between a first device in the first AS and the second AS.

At 404, the first controller may encode a service identifier (ID) into an Internet Protocol (IP) address. In some instances, the service ID indicates a service that is being requested to be provisioned on a second device in the second AS to establish the connection. In some examples, the first controller may further encode contact information including a unique local address associated with the first device, a service route identifier associated with a service route used for the connection, and a service provider identifier associated with a service provider that managed the first AS.

At 406, the first controller may provide the IP address to the first device. For instance, the first controller may send the IP address to the first device to be advertised or sent using BGP. In some instances, a selective route download feature of the BGP may be enabled such that a host route associated with the IP address is not downloaded into other RIBs or forwarding information bases (FIBs) associated with one or more network devices in at least one of the network or the second AS. In some instances, the first controller may program the IPv6 address into a routing information base (RIB) of the first device, depending on the embodiment.

At 408, the first device may send, using a control-plane protocol, over the network, and to the second AS, an advertisement message that indicates the IP address is an IP route, wherein the service ID is usable in the second AS to provision the service on the second device to establish the connection. In some instances, the method 400 additionally includes identifying an external network-to-network interface (ENNI) for the first AS and the second AS, where the advertisement message is sent over the ENNI.

FIG. 5 illustrates a flow diagram of an example method 500 for a second device to instantiate a service using instantiation information provided in an IP route advertised from a first device. The method 500 may be to utilize a protocol to receive a request to establish a connection over a network and between a first autonomous system (AS) and a second AS.

At 502, a device in the second AS (which may or may not be the second device) may receive an advertisement message sent from a first device in the first AS, where the advertisement message includes an Internet Protocol (IP) address associated with a host route.

At 504, the device in the second AS may send at least the IP address to a second controller of the second AS. In some instances, the protocol used to send the advertisement message is a Border Gateway Protocol (BGP), and the advertisement message is sent to the second controller using a BGP Monitoring Protocol (BMP).

At 506, the second controller may decode a service ID from the IP address, and at 508, determine that the service ID indicates a service that is being requested to be provisioned on a second device in the second AS to establish the connection. At 510, the service may be provisioned on a second device in the second AS to enable establishment of the connection between the first AS and the second AS.

Figure 6:
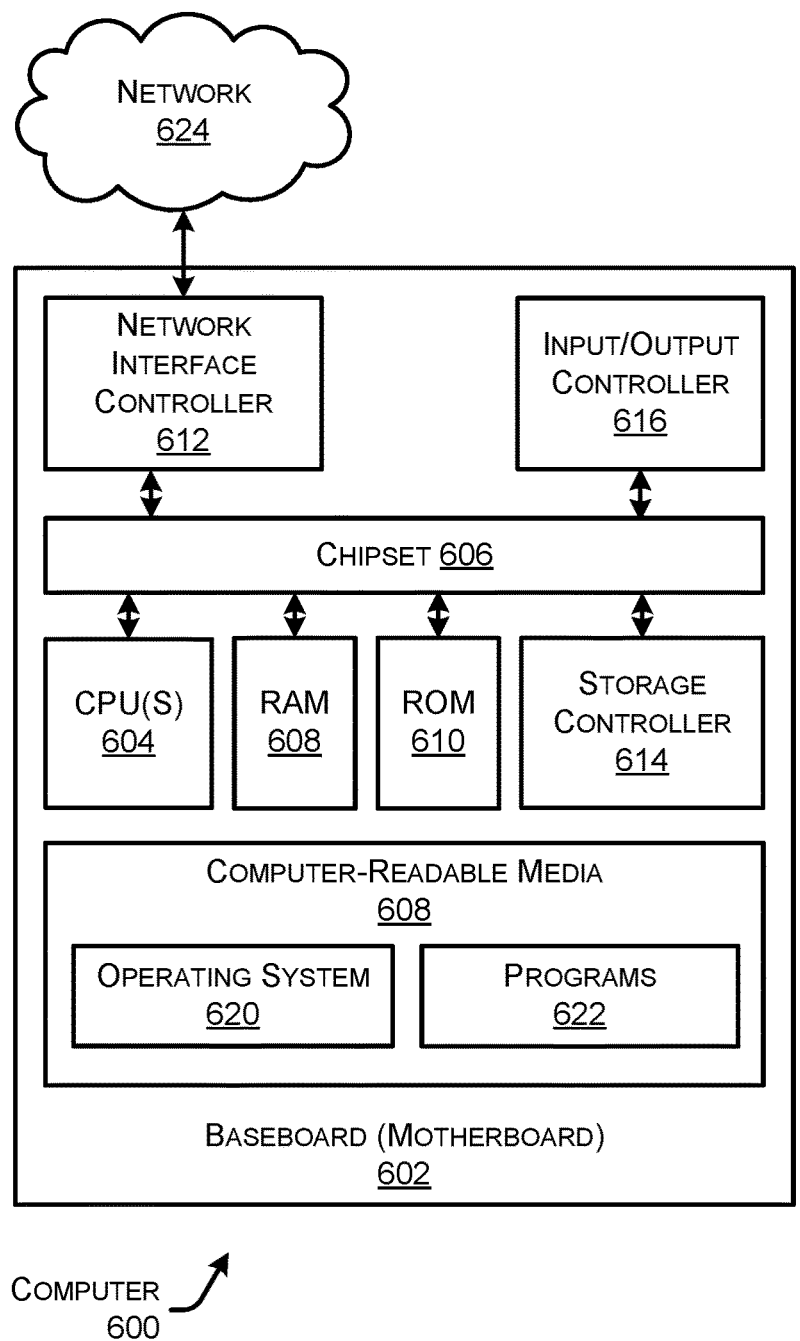
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described above. The computer architecture shown in FIG. 6 illustrates a conventional router, switch, node, or other computing device, and can be utilized to execute any of the software components presented herein. The computer 600 may, in some examples, correspond to a head-end router 108, a tail-end router 118, and/or another device described herein, and may comprise networked devices such as servers, switches, routers, hubs, bridges, gateways, modems, repeaters, access points, controllers, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 624. The chipset 606 can include functionality for providing network connectivity through a NIC 612, such as a gigabit Ethernet adapter. The NIC 612 is capable of connecting the computer 600 to other computing devices over the network 624. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by devices such as the head-end router 108, tail-end router 118, etc., and or any components included therein, may be supported by one or more devices similar to computer 600. Stated otherwise, some or all of the operations performed by the head-end router 108, tail-end router 118, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-9. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device.

As described herein, the computer 600 may comprise one or more of a head-end router 108, tail-end router 118, and/or other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the head-end router 108 and/or tail-end router 118. The network interfaces may include devices configured to couple to personal area networks (PANs), wired and wireless local area networks (LANs), wired and wireless wide area networks (WANs), etc. For example, the network interfaces may include devices compatible with Ethernet, Wi-Fi™, etc.

The programs 622 may comprise any type of programs or processes to perform the techniques described in this disclosure by the head-end router 108 and/or tail-end router 118.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method to utilize a protocol to signal intent to establish a connection over a network and between a first autonomous system (AS) and a second AS, the method comprising:
    determining, at a first controller of the first AS, to establish the connection between a first device in the first AS and the second AS;
    encoding, by the first controller, a service identifier (ID) into an Internet Protocol (IP) address, wherein the service ID indicates a service that is being requested to be provisioned on a second device in the second AS to establish the connection;
    providing, by the first controller, the IP address to the first device;
    sending, using a control-plane protocol, over the network, and to the second AS, an advertisement message that indicates the IP address is an IP route, wherein the service ID is usable in the second AS to provision the service on the second device to establish the connection.

2. The method of claim 1, further comprising:
receiving, at the second AS, the advertisement message indicating the IP address as a host route;
sending at least the IP address to a second controller of the second AS;
decoding, by the second controller, the service ID from the IP address; and
provisioning the service on the second device to enable establishment of the connection between the first AS and the second AS.

3. The method of claim 2, wherein:
the control-plane protocol used to send the advertisement message is a Border Gateway Protocol (BGP); and
the advertisement message is sent to the second controller using a BGP Monitoring Protocol (BMP).

4. The method of claim 1, wherein the control-plane protocol is a Border Gateway Protocol (BGP), further comprising:
enabling a selective route download feature of the BGP such that a host route associated with the IP address is not downloaded into other RIBs or forwarding information bases (FIBs) associated with one or more network devices in at least one of the network or the second AS.

5. The method of claim 1, further comprising:
identifying an external network-to-network interface (ENNI) for the first AS and the second AS,
wherein the advertisement message is sent over the ENNI.

6. The method of claim 1, further comprising encoding, by the first controller, contact information associated with the first device, the contact information including:
a unique local address associated with the first device;
a service route identifier associated with a service route used for the connection; and
a service provider identifier associated with a service provider that managed the first AS.

7. The method of claim 1, further comprising:
encoding, by the first controller, work-in-progress (WIP) data that indicates a timeout period during which the service is to be provisioned to establish the connection.

8. The method of claim 1, further comprising:
receiving, at the first device, a second IP address as an IP route from the second device;
determining that the second IP address indicates that the second device was unable to provision the service.

9. A system comprising:
one or more processors; and
one or more non-transitory computer-readable media storing computer-executable instructions that, when executed by the one or more processors, cause the one or more processors to perform operations comprising:
determining, at a first controller of a first autonomous system (AS), to establish a connection between a first device in the first AS and a second AS;
encoding, by the first controller, a service identifier (ID) into an Internet Protocol (IP) address, wherein the service ID indicates a service that is being requested to be provisioned on a second device in the second AS to establish the connection;
providing, by the first controller, the IP address to the first device;
sending, using a control-plane protocol and to the second AS, an advertisement message that indicates the IP address is an IP route, wherein the service ID is usable in the second AS to provision the service on the second device to establish the connection.

10. The system of claim 9, the operations further comprising:
receiving, at the second AS, the advertisement message indicating the IP address as a host route;
sending at least the IP address to a second controller of the second AS;
decoding, by the second controller, the service ID from the IP address; and
provisioning the service on the second device to enable establishment of the connection between the first AS and the second AS.

11. The system of claim 9, wherein:
the control-plane protocol used to send the advertisement message is a Border Gateway Protocol (BGP); and
the advertisement message is sent to the second controller using a BGP Monitoring Protocol (BMP).

12. The system of claim 9, wherein the control-plane protocol is a Border Gateway Protocol (BGP), the operations further comprising:
enabling a selective route download feature of the BGP such that a host route associated with the IP address is not downloaded into other RIBs or forwarding information bases (FIBs) associated with one or more network devices in at least one of the network or the second AS.

13. The system of claim 9, the operations further comprising:
receiving, at the first device, a second IP address as an IP route from the second device;
determining that the second IP address indicates that the second device was unable to provision the service.

14. The system of claim 13, the operations further comprising:
based at least in part on the second device being unable to provision the service, encoding a second service IP into a second IP address, wherein the second service ID indicates a second service that is being requested to be provisioned on the second device; and
sending, using the control-plane protocol and to the second AS, a second advertisement message that indicates the second IP address is a second IP route, wherein the second service ID is usable in the second AS to provision the second service on the second device.

15. The system of claim 9, the operations further comprising:
encoding, by the first controller, work-in-progress (WIP) data that indicates a timeout period during which the service is to be provisioned to establish the connection.

16. One or more non-transitory computer-readable media storing computer-executable instructions that, when executed by one or more processors, cause the one or more processors to perform operations comprising:
determining, at a first controller of a first autonomous system (AS), to establish a connection between a first device in the first AS and a second AS;
encoding, by the first controller, a service identifier (ID) into an Internet Protocol (IP) address, wherein the service ID indicates a service that is being requested to be provisioned on a second device in the second AS to establish the connection;
providing, by the first controller, the IP address to the first device;
sending, using a control-plane protocol and to the second AS, an advertisement message that indicates the IP address is an IP route, wherein the service ID is usable in the second AS to provision the service on the second device to establish the connection.

17. The one or more non-transitory computer-readable media of claim 16, the operations further comprising:
  receiving, at the second AS, the advertisement message indicating the IP address as a host route;
  sending at least the IP address to a second controller of the second AS;
  decoding, by the second controller, the service ID from the IP address; and
  provisioning the service on the second device to enable establishment of the connection between the first AS and the second AS.

18. The one or more non-transitory computer-readable media of claim 16, wherein:
  the control-plane protocol used to send the advertisement message is a Border Gateway Protocol (BGP); and
  the advertisement message is sent to the second controller using a BGP Monitoring Protocol (BMP).

19. The one or more non-transitory computer-readable media of claim 16, wherein the control-plane protocol is a Border Gateway Protocol (BGP), the operations further comprising:
  enabling a selective route download feature of the BGP such that a host route associated with the IP address is not downloaded into other RIBs or forwarding information bases (FIBs) associated with one or more network devices in at least one of the network or the second AS.

20. The one or more non-transitory computer-readable media of claim 16, the operations further comprising:
  receiving, at the first device, a second IP address as an IP route from the second device;
  determining that the second IP address indicates that the second device was unable to provision the service.

* * * * *